(12) United States Patent
Liou et al.

(10) Patent No.: US 7,564,682 B2
(45) Date of Patent: Jul. 21, 2009

(54) DISPLAY WITH MULTIPLE ADJUSTABLE POSITIONS AND ANGLES

(75) Inventors: Guan-De Liou, Taipei (TW); Chia-Pine Huang, Keelung (TW); Li-Li Lai, Banciao (TW); Stephen Tsai, Sijhih (TW)

(73) Assignee: Hannspree, Inc., Taipei (TW)

( * ) Notice: Subject to any disclaimer, the term of this patent is extended or adjusted under 35 U.S.C. 154(b) by 105 days.

(21) Appl. No.: 11/319,543

(22) Filed: Dec. 29, 2005

(65) Prior Publication Data

US 2007/0125914 A1 Jun. 7, 2007

(30) Foreign Application Priority Data

Dec. 6, 2005 (TW) ............... 94142884 A

(51) Int. Cl.
*H05K 5/00* (2006.01)
*H05K 7/00* (2006.01)
*G06F 1/16* (2006.01)

(52) U.S. Cl. .......... 361/681; 248/125.8; 248/125.3; 248/125.1; 248/125.7; 248/918; 248/919; 248/921; 248/923; 248/125.9; 248/131; 248/181.1; 248/288.31; 361/683

(58) Field of Classification Search ........... 248/918, 248/125.9, 131, 181.1, 288.31, 919, 921, 248/923; 361/681, 682
See application file for complete search history.

(56) References Cited

U.S. PATENT DOCUMENTS

| | | | | |
|---|---|---|---|---|
| 1,890,696 | A * | 12/1932 | Rosenhahn | 482/90 |
| 2,464,690 | A * | 3/1949 | Ketchem | 108/29 |
| 2,565,446 | A * | 8/1951 | Abbott | 355/47 |
| 5,080,315 | A * | 1/1992 | Tucker-Schafer | 248/441.1 |
| 5,751,548 | A * | 5/1998 | Hall et al. | 361/686 |
| 5,761,844 | A * | 6/1998 | Horschel | 43/21.2 |
| 5,923,528 | A * | 7/1999 | Lee | 361/681 |
| 6,437,975 | B1 * | 8/2002 | Huang | 361/681 |
| 6,585,201 | B1 * | 7/2003 | Reed | 248/181.1 |
| 7,114,688 | B2 * | 10/2006 | Rudolf | 248/278.1 |
| 7,237,757 | B2 * | 7/2007 | Wakura | 248/454 |

* cited by examiner

*Primary Examiner*—J. Allen Shriver, II
*Assistant Examiner*—Nkeisha J Smith
(74) *Attorney, Agent, or Firm*—Bacon & Thomas, PLLC

(57) ABSTRACT

A display is disclosed to include a base, a post coupled to the base through a ball and socket joint for free adjustment at different angles, a holder assembly coupled and movable along the post, a locking device mounted in the holder assembly for locking the holder assembly to the post at the desired height, and a screen pivotally coupled to a pivot member at the holder assembly.

14 Claims, 8 Drawing Sheets

DISPLAY WITH MULTIPLE ADJUSTABLE POSITIONS AND ANGLES

BACKGROUND OF THE INVENTION

1. Field of the Invention

The present invention relates to display devices and more particularly, to a flat-panel display that allows the user to conveniently adjust the direction and angle of the screen with single hand.

2. Description of Related Art

Following rapid development of display manufacturing technology and mass production of liquid crystal displays (LCDs), such display devices have become intensively used to replace conventional CRT monitors and now dominate the market.

An LCD has a liquid crystal cell positioned between two polarizers. An electric field is applied to the liquid crystal cell to make light pass through cell. The liquid crystal filled in the cell, therefore, is like a shutter, either allowing light to pass through or blocking the light. Therefore, the LCD has a certain range of visible angle and a preferable visual angle. An LCD must allow the user to conveniently adjust the viewing angle of the display subject to need or environmental conditions. This angle adjustment feature is important in product design of displays.

The angle adjustment structure of an LCD may be formed of a pivot joint or hinge mechanism. The pivot joint or hinge mechanism allows the user to adjust the tilting angle and direction of the screen.

However, conventional pivot joints and hinge mechanisms for LCD commonly have a complex structure that is expensive to be manufactured. When adjusting the tilting angle of the screen, the user must hold the base of the LCD with one hand and tilts the screen with the other hand thus this adjustment procedure is inconvenient. Further, an LCD using a conventional pivot joint or hinge mechanism provides the user adjustment of the tilting angle in one particular direction only. It does not allow the user to adjust the tilting angle of the screen in different directions.

Therefore, it is desirable to provide a display with multiple adjustable positions and angles that eliminates the aforesaid drawbacks.

SUMMARY OF THE INVENTION

A display in accordance with the present invention is comprised of a screen, a base, a post, and a holder assembly. The screen comprises a pivot unit fixedly provided at the backside thereof. The base has a top surface and a concave hole in the top surface. The post comprises a post body and a universal joint fixedly provided at the bottom end of the post body and pivotally coupled to the concave hole of the base. Further, the holder assembly is adapted to hold the screen on the post. The holder assembly comprises a holding member mounted on the post body of the post and movable along the length of the post body of the post, a pivot member fixedly provided at the holding member and pivotally coupled to the pivot unit of the screen, and a locking device adapted to secure the holding member to the post body of the post.

By means of the coupling structure between the universal joint of the post and the concave hole of the base, the user can adjust the direction and tilting angle of the screen subject to different requirements or different environments. The user can use single hand to hold the post and then to rotate or tilt the post relative to the base when adjusting the direction or tilting angle of the screen. Further, through the holder assembly, the user can conveniently adjust the height of the screen on the post. Further, the user can turn the screen about the pivot member at the holding member of the holder assembly clockwise or counterclockwise to the desired position.

Further, the pivot member of the holder assembly can be a stub shaft pivotally coupled to the pivot unit of the screen. Alternatively, the pivot unit can be made in the shape of a stub shaft pivotally coupled to the pivot member of the holder assembly.

Further, the post body of the post can be a cylinder rod, a rectangular prism, or any of a variety of rod members of different profiles.

Further, the post can be made having at least one gear rack fixedly provided at the periphery of the post body along the length, and the locking device of the holder assembly can be formed of at least one gear pivotally mounted in the holding member and respectively meshed with the at least one gear rack at the post body of the post to secure the holding member to the post body of the post by a friction force. This design allows the user to directly adjust the height of the holding member on the post body of the post with single hand.

Further, the screen comprises a flat-panel display, for example, a liquid crystal display, or a plasma display, or an organic light emitting display therein.

DETAILED DESCRIPTION OF THE PREFERRED EMBODIMENT

Figure 1:
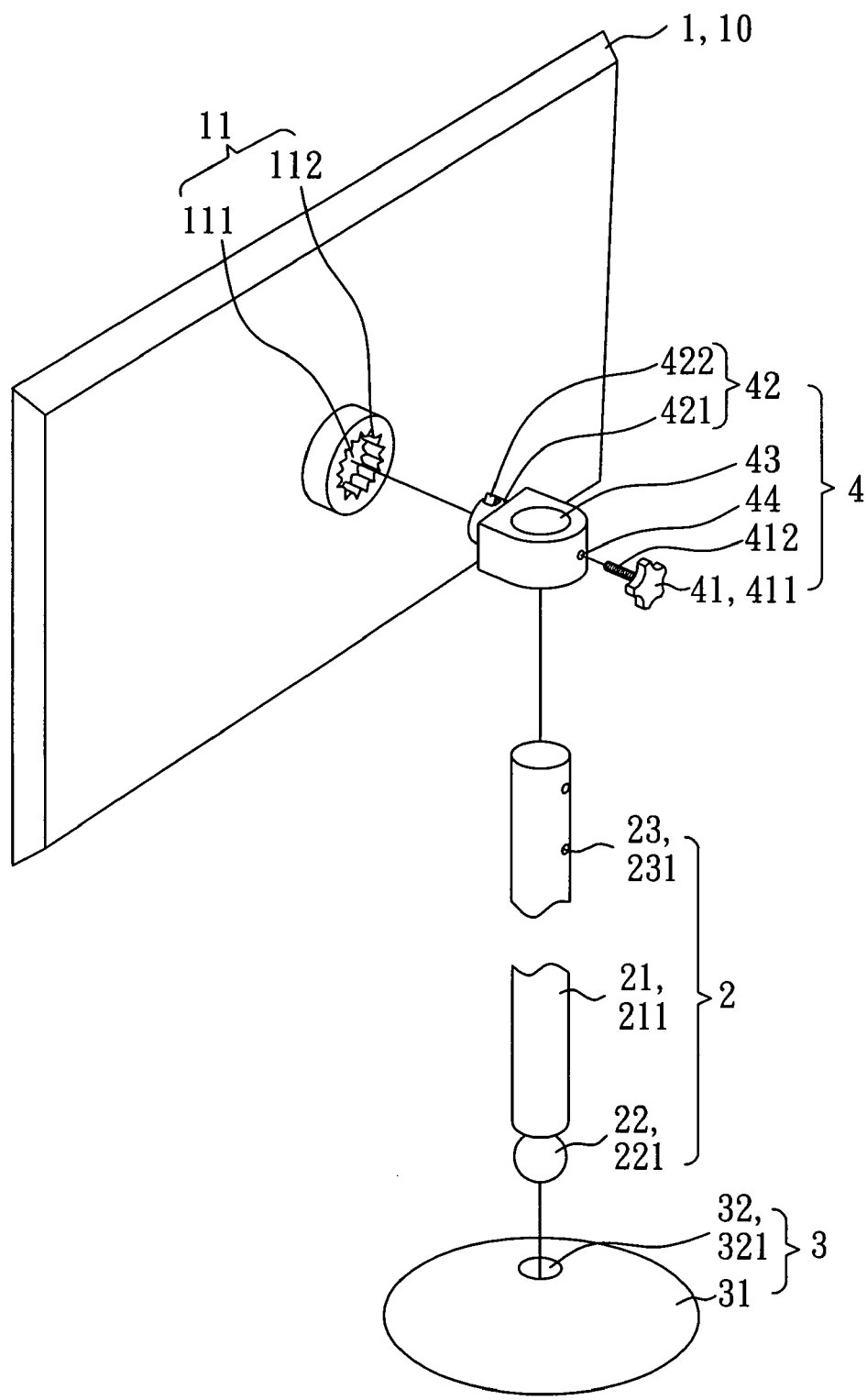
FIG. 1 is an exploded view of a display constructed according to a first embodiment of the present invention.

Referring to FIG. 1, a display in accordance with the first embodiment of the present invention is shown comprised of a screen 1, a post 2, a base 3, and a holder assembly 4.

The screen 1 according to this embodiment comprises an LCD 10 (Liquid Crystal Display), and a pivot unit 11 fixedly provided at the backside thereof. The pivot unit 11 has an axle hole 111, and a plurality of positioning grooves 112 equiangularly spaced around the inside wall of the axle hole 111. According to this embodiment, the quantity of the positioning grooves 112 is fifteen.

The base 3 has a top surface 31, and a top concave hole 32 is formed in the top surface 31. According to this embodiment, the top concave hole 32 forms a ball socket 321.

The post 2 comprises a post body 21, a universal joint 22, and a plurality-aligned of locating holes 23. The universal joint 22 is fixedly provided at the bottom end of the post body 21 and pivotally coupled to the top concave hole 32 of the base 3. The locating holes 23 are formed in the periphery of the post body 21 at different heights. According to this embodiment, the post body 21 is a cylinder rod 211; the universal joint 22 is a ball-shaped connector 221; and, the locating holes 23 are screw holes 231.

Further, the holder assembly 4 comprises a locking device 41, a pivot member 42, and an annular holding member 43 defining therein a through hole for the insertion of the post body 21 of the post 2. The annular holding member 43 is sleeved onto the post body 21 and is movable along the post body 21, having a radial through hole 44. The locking device 41 is adapted to secure the annular holding member 43 to the post body 21 of the post 2. According to this embodiment, the locking device 41 is a lock pin 411, having a threaded shank 412 inserted through the radial through hole 44 and selectively threaded into one of the screw holes 231 of the post 2 to secure the annular holding member 43 to the post 2 at the selected height. The pivot member 42 is fixedly perpendicular connected to the annular holding member 43 at one side and connected to the pivot units 11 of the screen 1. According to this embodiment, the pivot member 42 is a short shaft or cylindrical member 421 that mates with the axle hole 111 of the pivot unit 11 of the screen 1. The shaft 421 has a retaining protrusion 422 radially protruded from the periphery for selectively engaging into one of the positioning grooves 112 in the pivot unit 11 of the screen 1 upon insertion of the shaft 421 into the axle hole 111 of the pivot unit 11 to secure the screen 1 to the holder assembly 4 at the desired angle.

Further, the user can hold the post 2 with single hand and then rotates the post 2 in the top concave hole 32 or tilts the post 2 relative to the top concave hole 32 (ball socket 321) to adjust the direction and tilting angle of the screen 1. Further, the screen 1 can be turned about the shaft 421 clockwise or counterclockwise to the desired angle. The pivoting structure of the display in accordance with the present invention is quite simple, thereby simplifying the assembly process and greatly reducing the cost of the production.

FIGS. 2~5 show the height, direction and angle adjustment of the screen of the display in accordance with the first embodiment of the present invention.

Figure 2:
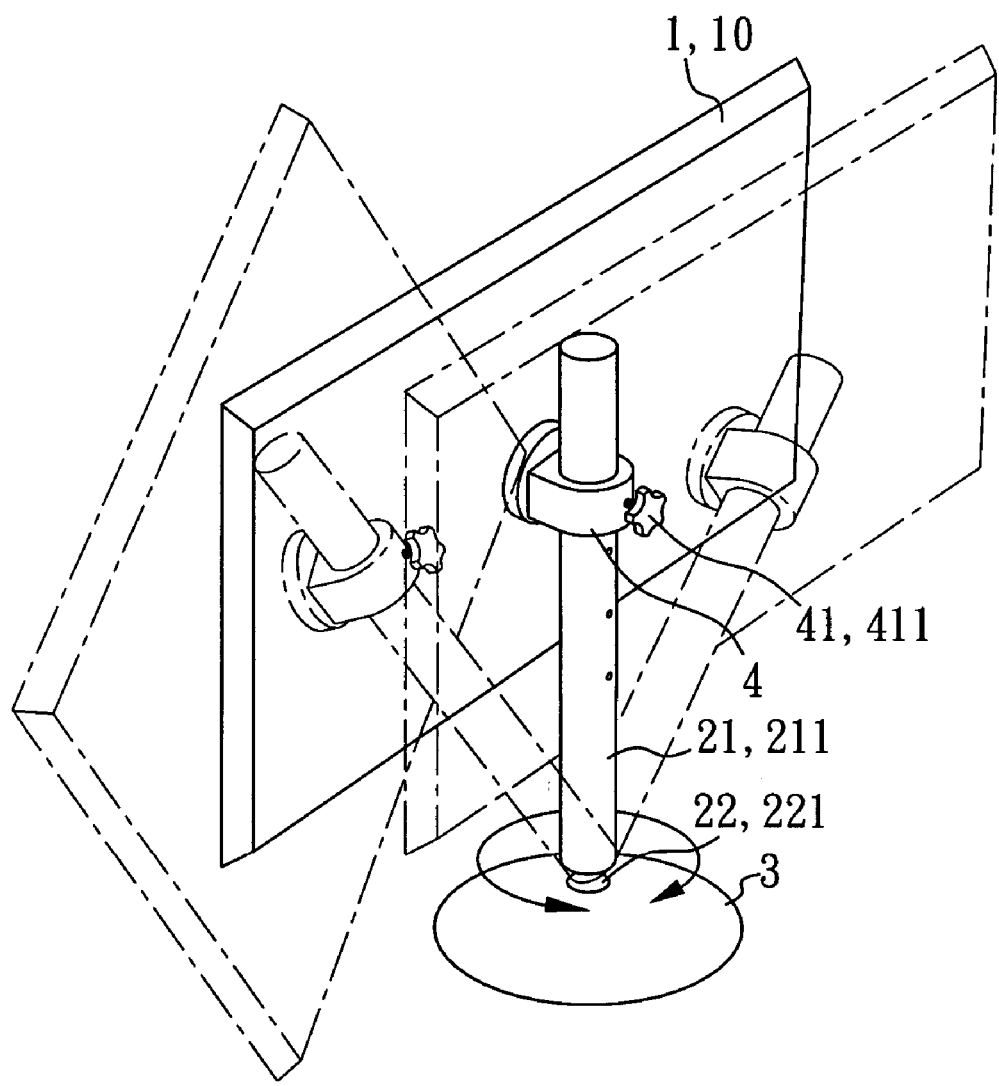
FIG. 2 is a schematic drawing showing a position adjustment example of the post according to the first embodiment of the present invention.

Referring to FIG. 2, through the coupling of the universal joint 22 to the base 3, the user can hold the post body 21 with single hand to rotate or to tilt the post 2 relative to the base 3 to adjust the direction and tilting angle of the screen 1.

Figure 3:
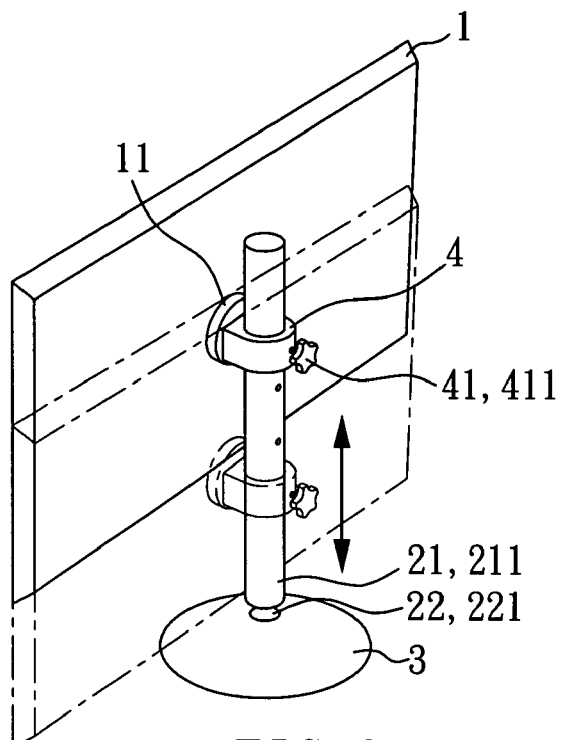
FIG. 3 is a schematic drawing showing height adjustment example of the screen with the holder assembly relative to the post according to the first embodiment of the present invention.

Referring to FIG. 3, when loosening the locking device 41 (lock screw 411) to disengage the annular holding member 43 from the post 2, the user can move the holder assembly 4 with the screen 1 along the post body 21 to adjust the height of the screen 1. After the screen 1 has been adjusted to the desired height corresponding to one screw hole 231 at the post body 21 of the post 2, the locking device 41 (lock screw 411) is fastened to the associated screw hole 231 to secure the annular holding member 43 to the post 2 at the desired height.

Figure 4:
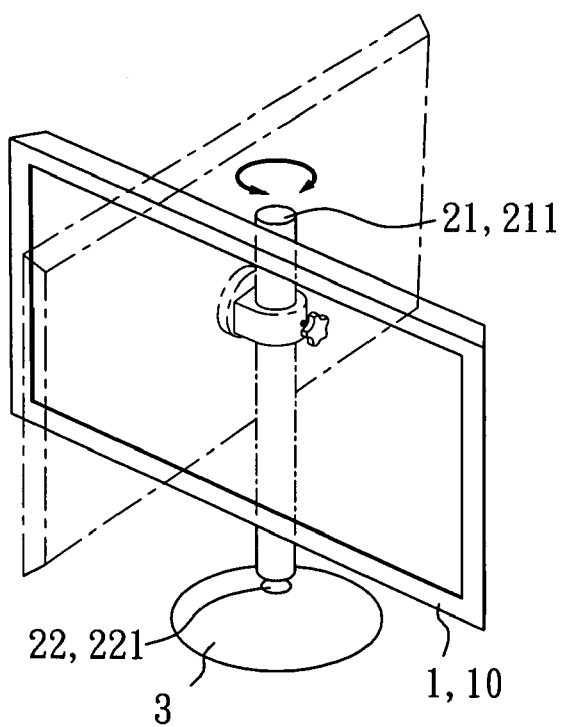
FIG. 4 is a schematic drawing showing the screen turned with the holder assembly horizontally about the post according to the first embodiment of the present invention.
Figure 5:
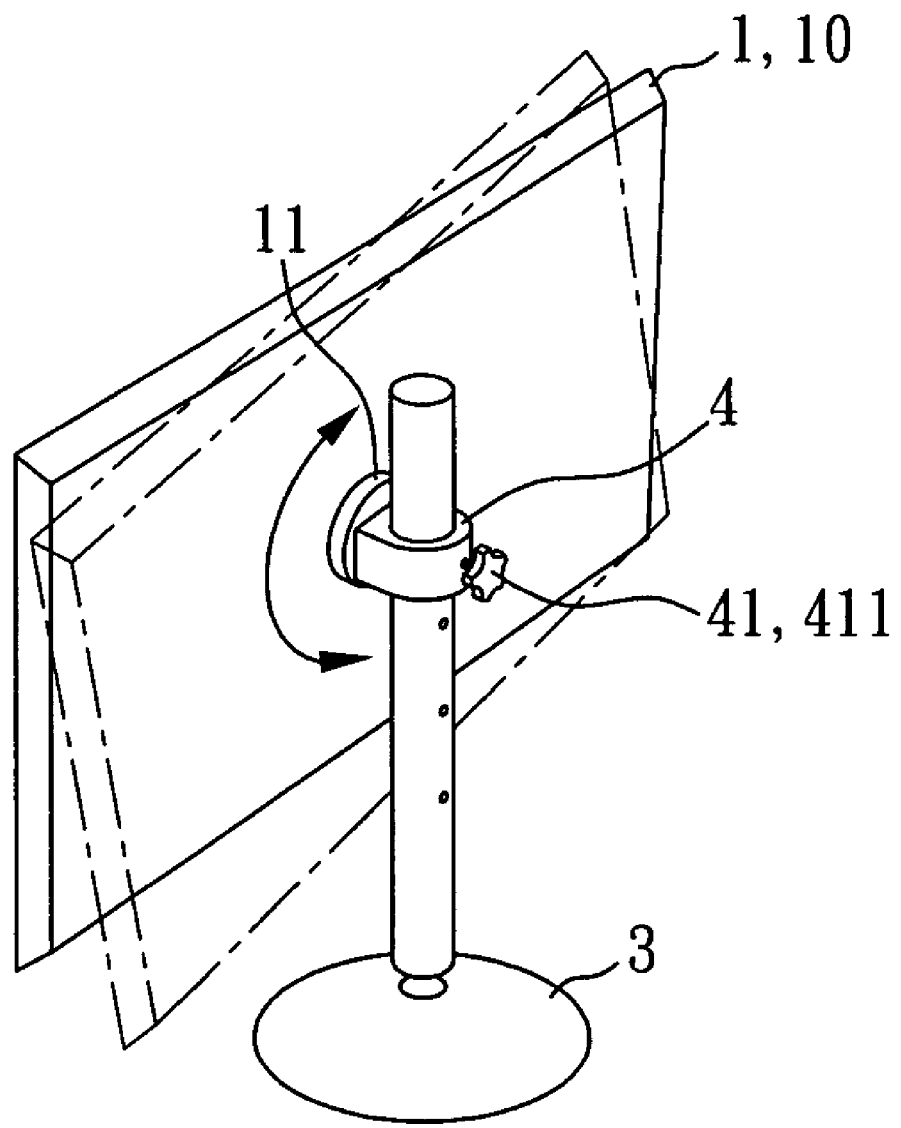
FIG. 5 is a schematic drawing showing the screen turned about the pivot member of the holder assembly vertically according to the first embodiment of the present invention.

Further, the screen 1 can be turned with the holder assembly 4 about the post 2 clockwise/counterclockwise to the desired position as shown in FIG. 4, or turned about the pivot member 42 clockwise/counterclockwise to the desired position as shown in FIG. 5.

Figure 6:
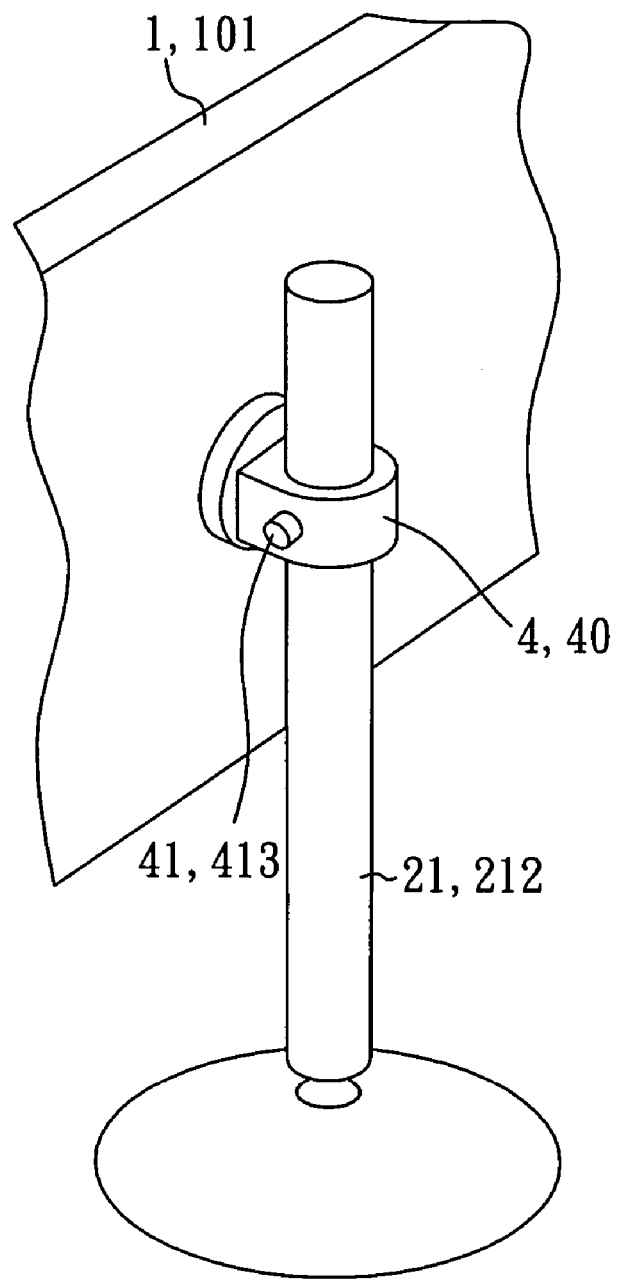
FIG. 6 is an elevational view of a part of a display according to a second embodiment of the present invention.
Figure 7:
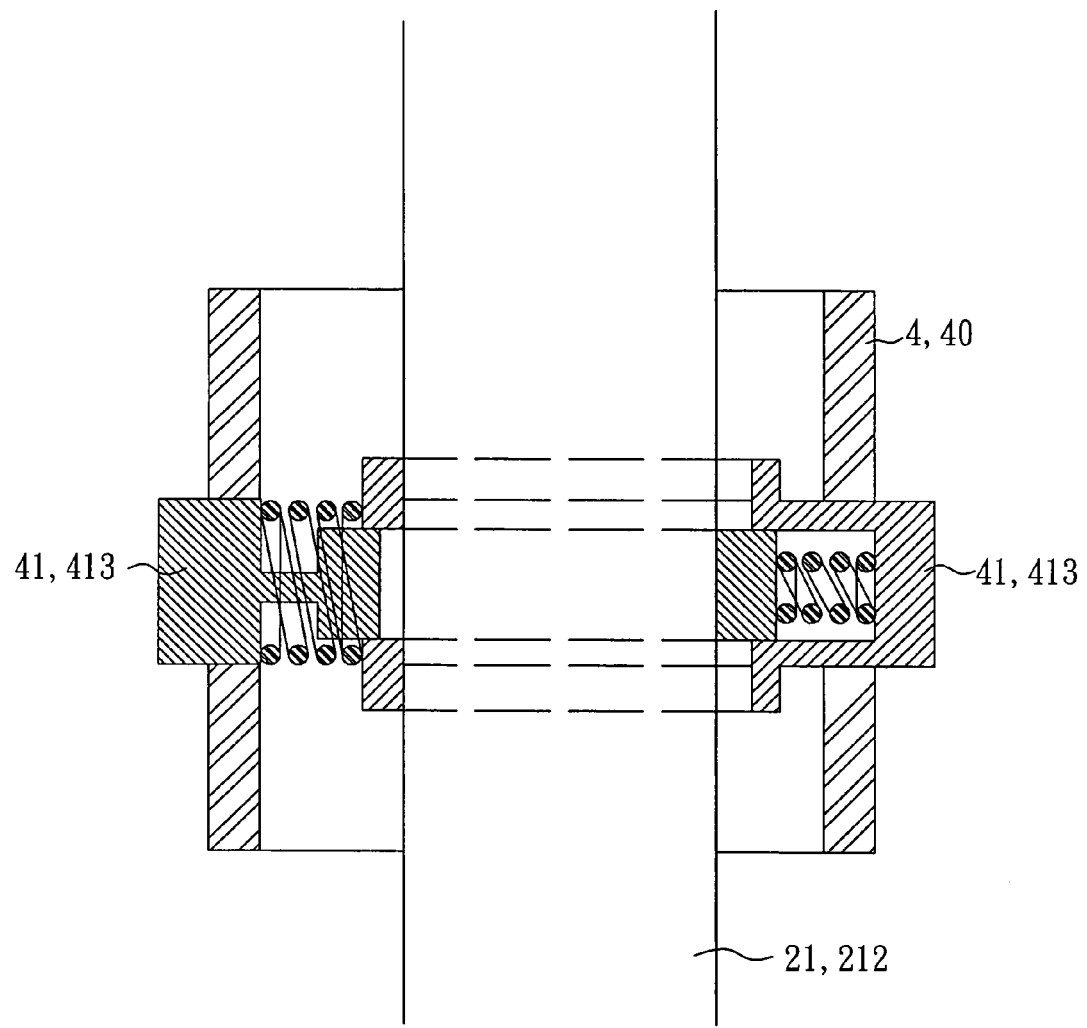
FIG. 7 is a sectional view of holder assembly.

Referring to FIGS. 6 and 7, the second embodiment of the present invention is substantially similar to the aforesaid first embodiment with the exception of the locking device 41 of the holder assembly 4. According to this second embodiment, the locking device 41 of the holder assembly 40 (equivalent to reference sign 4 in the aforesaid first embodiment) is comprised of two spring-supported knobs 413 symmetrically disposed at two opposite sides and adapted to engage the holder assembly 4 and the screen 101 (equivalent to reference sign 1 in the aforesaid first embodiment) on the post body 212 (equivalent to reference sign 21 in the aforesaid first embodiment). To adjust the height of the screen, the user can conveniently operate the spring-supported knobs 413 with single hand, by pressing the spring-supported knobs 413 the holder assembly 40 releases the clamp on the post body 212 allows user to adjust the screen 101 to the desired height.

Figure 8:
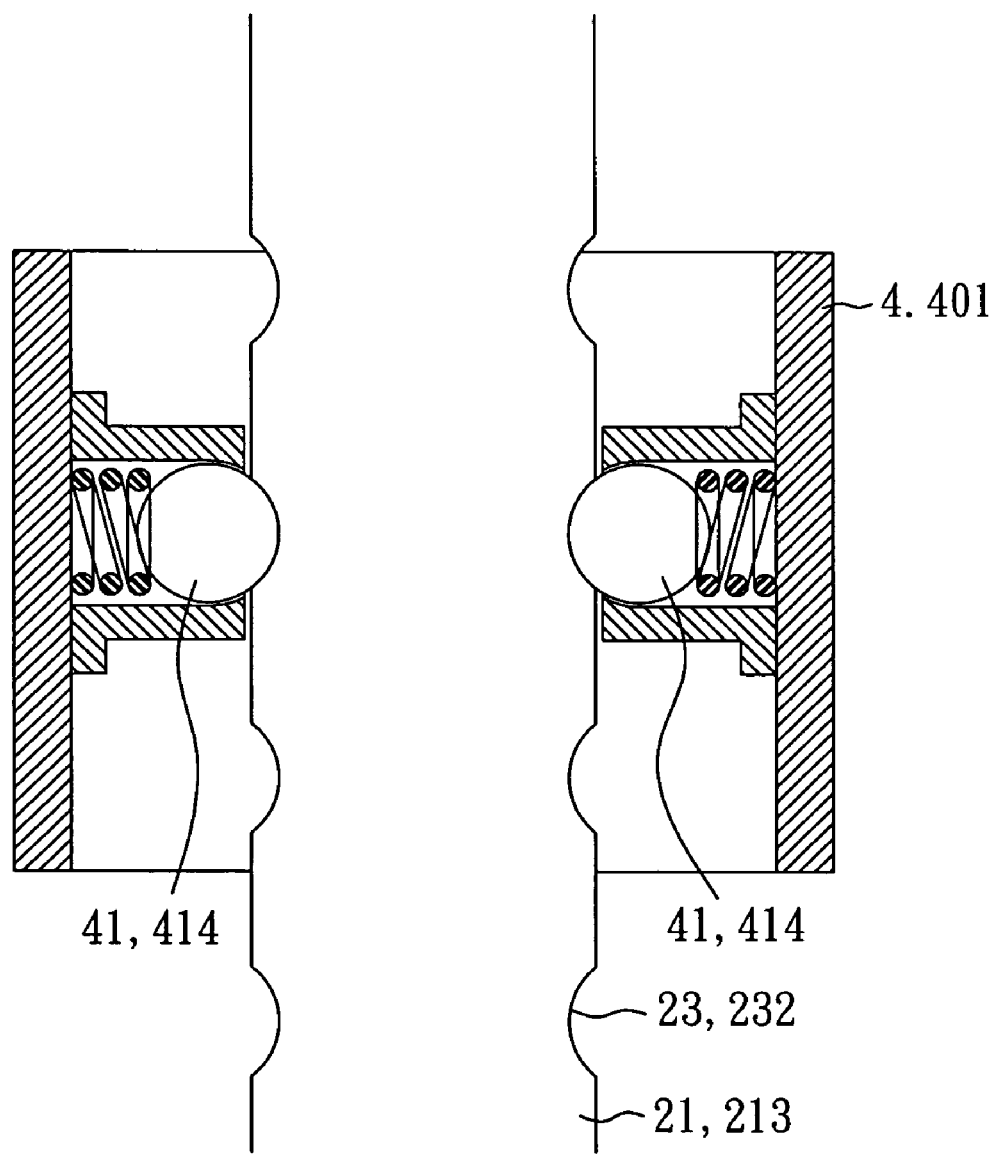
FIG. 8 is a sectional view of a locking mechanism of display according to a third embodiment of the present invention.

Then by releasing the spring-supported knobs 413, the holder assembly 40 clamps onto the post body 212 and preventing any movements. FIG. 8 is a sectional view of a locking mechanism of display according to a third embodiment of the present invention. The third embodiment of the present invention is substantially similar to the aforesaid first embodiment with the exception of the locking device 41 of the holder assembly 4. According to this third embodiment, the locking device 41 of the holder assembly 401 (equivalent to reference sign 4 in the aforesaid first embodiment) is comprised of two spring-supported retaining ball 414 being received in an aligned pair of positioning holes 232 (equivalent to reference sign 23 in the aforesaid first embodiment), formed in the post body 213 (equivalent to reference sign 21 in the aforesaid first embodiment). The user can conveniently operate the holder assembly 401 to locate at the post body 213 at the selected height just with single hand.

Figure 9:
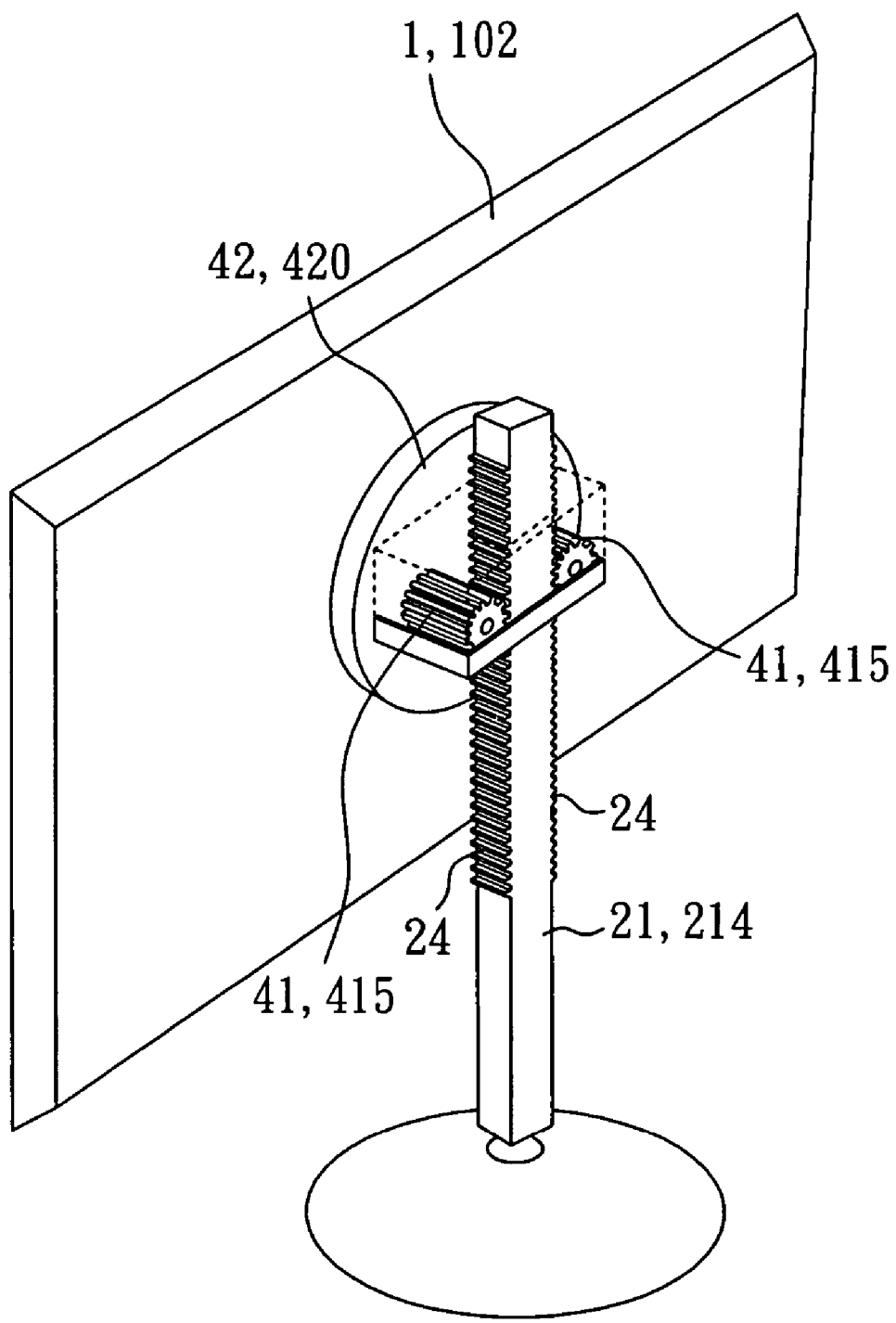
FIG. 9 is a perspective view of a display according to a fourth embodiment of the present invention.

FIG. 9 is a perspective view of the fourth embodiment of the present invention. According to this embodiment, the post body 21 is a rectangular prism 214 that has two gear racks 24 longitudinally fixedly provided at two sides; the locking device 41 is comprised of two gears 415 pivotally mounted on the pivot member 420 (equivalent to reference sign 42 in the aforesaid first embodiment) and respectively meshed with the gear racks 24. By means of friction resistance between the gears 415 and the gear racks 24, the screen 102 (equivalent to reference sign 1 in the aforesaid first embodiment) is adjustably secured to the rectangular prism 214. This embodiment also allows the user to adjust the height of the screen 102 conveniently with single hand.

Although the present invention has been explained in relation to its preferred embodiments, it is to be understood that many other possible modifications and variations can be made without departing from the spirit and scope of the invention as hereinafter claimed.

What is claimed is:

1. A display with multiple adjustable positions and angles, comprising:
   a screen, said screen comprising a pivot unit;
   a base, said base having a top surface with a concave hole;
   a post vertically mounted in said concave hole of said base, said post comprising a post body and a universal joint fixedly provided at a bottom end of said post body and pivotally coupled to said concave hole of said base; and
   a holder assembly adapted to hold said screen on said post, said holder assembly comprising a holding member mounted on said post body and movable along the length of said post body, a pivot member fixedly provided at said holding member and pivotally coupled to the pivot unit of said screen, and a locking device adapted to lock said holding member to the post body;
   wherein said pivot member is a shaft pivotally coupled to the pivot unit of said screen; and
   wherein said pivot unit comprises an axle hole and a plurality of positioning grooves equiangularly arranged in a periphery defining said axle hole; said shaft has a retaining protrusion radially protruded from said periphery thereof for selectively engaging into one of the positioning grooves of the pivot unit.

2. The display as claimed in claim 1, wherein said concave hole is a ball socket; wherein said universal joint is a ball-shaped connector coupled to said ball socket.

3. The display as claimed in claim 1, wherein said post comprises a plurality of positioning holes formed in said periphery of said post body at different heights for receiving said locking device selectively.

4. The display as claimed in claim 3, wherein the locking device comprises at least one spring-supported retaining ball mounted in said holding member and adapted to engage at least one of the positioning holes of said post selectively to secure said holding member to said post at the selected height.

5. The display as claimed in claim 3, wherein said holding member has a radial through hole, and said locking device is mounted in said radial through hole and selectively fastened to one of the positioning holes to secure said locking device to said post at the selected height.

6. The display as claimed in claim 5, wherein the locking device is a lock pin.

7. The display as claimed in claim 6, wherein the positioning holes are screw holes, and the locking device has a threaded shank selectively threaded into one of the screw holes of said post.

8. The display as claimed in claim 7, wherein the post body of said post is a cylinder rod.

9. The display as claimed in claim 1, wherein the holding member is an annular holding member defining a through hole for the insertion of the post body.

10. The display as claimed in claim 1, wherein the locking device comprises two spring-supported knobs respectively mounted in said holding member at two sides and clamping the periphery of said post body to lock said holding member to said post.

11. The display as claimed in claim 1, wherein said screen comprises a flat-panel display.

12. The display as claimed in claim 1, wherein said screen comprises a liquid crystal display.

13. The display device as claimed in claim 1, wherein said screen comprises a plasma display.

14. The display as claimed in claim 1, wherein said screen comprises an organic light emitting display.

\* \* \* \* \*